(12) United States Patent
Ge et al.

(10) Patent No.: US 11,135,775 B2
(45) Date of Patent: Oct. 5, 2021

(54) PRINTHEAD CLEANING SYSTEM

(71) Applicant: HEWLETT-PACKARD DEVELOPMENT COMPANY, L.P., Houston, TX (US)

(72) Inventors: Ning Ge, Palo Alto, CA (US); Steven J. Simske, Ft. Collins, CO (US); Jun Zeng, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 397 days.

(21) Appl. No.: 16/076,363

(22) PCT Filed: Jan. 31, 2017

(86) PCT No.: PCT/US2017/015862
§ 371 (c)(1),
(2) Date: Aug. 8, 2018

(87) PCT Pub. No.: WO2018/143953
PCT Pub. Date: Aug. 9, 2018

(65) Prior Publication Data
US 2019/0039312 A1      Feb. 7, 2019

(51) Int. Cl.
*B29C 64/35*       (2017.01)
*B33Y 30/00*       (2015.01)
(Continued)

(52) U.S. Cl.
CPC .......... *B29C 64/35* (2017.08); *B29C 64/165* (2017.08); *B33Y 30/00* (2014.12); *B33Y 40/00* (2014.12); *B41J 2/16552* (2013.01)

(58) Field of Classification Search
CPC ..... B29C 64/35; B29C 64/165; B29C 64/106; B29C 64/209; B41J 2/16552; B33Y 30/00; B33Y 40/00; B33Y 10/00
See application file for complete search history.

(56) References Cited

U.S. PATENT DOCUMENTS 4,346,387 A * 8/1982 Hertz ................. B41J 2/115
118/624
5,081,472 A    1/1992 Fisher
(Continued)

FOREIGN PATENT DOCUMENTS

CN    105729799    7/2016
CN    205800220    12/2016
(Continued)

OTHER PUBLICATIONS

Lim, et al., "Prediction for particle removal efficiency of a reverse jet scrubber", Journal of Aerosol Science, vol. 37, 2006, pp. 1826-1839. < http://www.sciencedirect.com/science/article/pii/S0021850206001297 >.

*Primary Examiner* — Alexander Markoff
(74) *Attorney, Agent, or Firm* — Mannava & Kang

(57) ABSTRACT

According to an example, an apparatus may include a printhead to deliver a printing liquid from firing chambers through a plurality of bores arranged along a surface of the printhead. The apparatus may also include a cleaning system to apply a pressurized cleaning fluid onto the surface of the printhead while preventing application of the pressurized cleaning fluid into the firing chambers through the plurality of bores.

10 Claims, 5 Drawing Sheets

(51) Int. Cl.
*B33Y 40/00* (2020.01)
*B29C 64/165* (2017.01)
*B41J 2/165* (2006.01)

(56) References Cited

U.S. PATENT DOCUMENTS

| | | | | |
|---|---|---|---|---|
| 6,142,601 | A * | 11/2000 | Sharma | B41J 2/16552 |
| | | | | 347/28 |
| 6,149,072 | A * | 11/2000 | Tseng | B29C 41/006 |
| | | | | 239/87 |
| 6,196,657 | B1 * | 3/2001 | Hawkins | B41J 2/16552 |
| | | | | 347/25 |
| 6,312,090 | B1 | 11/2001 | Griffin et al. | |
| 6,350,007 | B1 * | 2/2002 | Meichle | B41J 2/16552 |
| | | | | 347/27 |
| 6,481,822 | B2 | 11/2002 | Murcia et al. | |
| 6,497,472 | B2 * | 12/2002 | Sharma | B41J 2/16544 |
| | | | | 347/28 |
| 6,513,903 | B2 * | 2/2003 | Sharma | B41J 2/16552 |
| | | | | 347/28 |
| 6,517,188 | B1 * | 2/2003 | Hawkins | B41J 2/16552 |
| | | | | 347/34 |
| 6,575,556 | B1 * | 6/2003 | Eremity | B41J 2/16552 |
| | | | | 347/28 |
| 6,595,617 | B2 * | 7/2003 | Sharma | B41J 2/16552 |
| | | | | 347/28 |
| 6,682,165 | B2 | 1/2004 | Yearout | |
| 6,802,588 | B2 * | 10/2004 | Garbacz | B41J 2/16552 |
| | | | | 347/28 |
| 7,419,239 | B2 * | 9/2008 | Brown | B41J 2/16552 |
| | | | | 347/10 |
| 8,185,229 | B2 | 5/2012 | Davidson | |
| 2002/0036670 | A1 * | 3/2002 | Colombat | B41J 2/16552 |
| | | | | 347/28 |
| 2002/0126174 | A1 | 9/2002 | Sharma | |
| 2004/0017421 | A1 * | 1/2004 | Jeanmaire | B41J 2/03 |
| | | | | 347/22 |
| 2005/0104926 | A1 | 5/2005 | Yamada et al. | |
| 2005/0206673 | A1 * | 9/2005 | Levin | B41J 2/1714 |
| | | | | 347/28 |
| 2005/0206675 | A1 * | 9/2005 | Levin | B41J 2/16552 |
| | | | | 347/36 |
| 2008/0100660 | A1 * | 5/2008 | Perrin | B41J 2/16552 |
| | | | | 347/28 |
| 2012/0186606 | A1 | 7/2012 | Barss | |
| 2014/0265034 | A1 * | 9/2014 | Dudley | B33Y 30/00 |
| | | | | 264/401 |
| 2017/0216918 | A1 * | 8/2017 | Orme-Marmarelis | B33Y 10/00 |

FOREIGN PATENT DOCUMENTS

| | | |
|---|---|---|
| DE | 102014007584 | 11/2015 |
| WO | WO-1995025636 A1 | 9/1995 |
| WO | WO-2016053245 A1 | 4/2016 |

* cited by examiner

PRINTHEAD CLEANING SYSTEM

BACKGROUND 3D manufacturing apparatuses that employ additive manufacturing techniques to build or print parts are gaining in popularity and use. Some additive manufacturing techniques employ a layering process in which particles of build material are spread into a layer and selectively fused together. Selective fusing of the build material particles may include the application of agents onto the layer from printheads. Following that process, additional particles are spread into another layer and selectively fused together. This process may be repeated for a number of times to build up a 3D part having a desired configuration.

BRIEF DESCRIPTION OF THE DRAWINGS

Features of the present disclosure are illustrated by way of example and not limited in the following figure(s), in which like numerals indicate like elements, in which.

DETAILED DESCRIPTION

During printing operations using a printhead having a plurality of bores through which printing liquid is expelled, and particularly, during printing operations involving build material particles as may occur during 3D printing, the particles as well as other debris may become adhered to the surface of the printhead on which the bores are arranged. Over time, the particles and other debris may migrate from the surface to the bores, which may clog the bores or otherwise disrupt firing of printing liquid through the bores.

Disclosed herein are apparatuses and methods for cleaning a printhead surface with pressurized cleaning fluid while preventing application of the pressurized cleaning fluid into firing chambers through the bores of the printhead. That is, for instance, the apparatuses and methods disclosed herein may cause the pressurized cleaning fluid to be sprayed onto a surface of the printhead on which the bores of the firing chambers are arranged. The pressurized cleaning fluid may be sprayed through a plurality of nozzles. In some examples, the nozzles may be arranged with respect to the bores to prevent or limit spraying of the cleaning fluid into the bores. In some examples, the nozzles may be angled with respect to the plane of the surface to direct the cleaning fluid sprays away from the bores. In some examples, the nozzles may be rotatable to vary the angles at which the cleaning fluid sprays land on the surface. In some examples, a charging electrode and a deflector plate may be used to electrically charge and steer droplets of the pressurized cleaning fluid to intended locations on the surface.

Through implementation of the apparatuses and methods disclosed herein, the surface on which firing chamber bores are arranged may be cleaned with pressurized cleaning fluid while preventing the pressurized cleaning fluid from being applied into the bores. Thus, for instance, build material particles and other debris may be removed from the surface of the printhead prior to the build material particles and other debris migrating into the bores.

Before continuing, it is noted that as used herein, the terms "includes" and "including" mean, but are not limited to, "includes" or "including" and "includes at least" or "including at least." The term "based on" means, but is not limited to, "based on" and "based at least in part on."

Figure 1A:
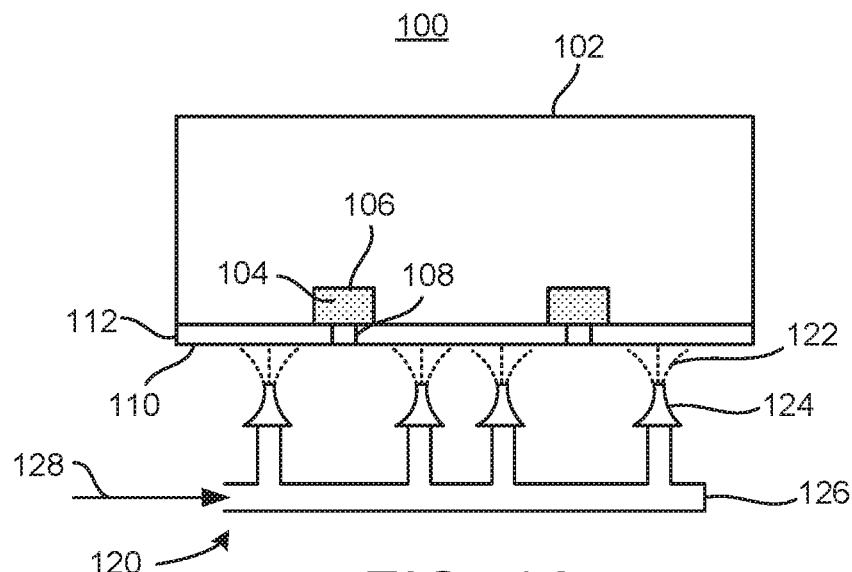
FIG. 1A shows a simplified block diagram of an example apparatus that may include components of a cleaning system.

With reference first to FIG. 1A, there is shown a simplified block diagram of an example apparatus 100 that may include components of a cleaning system. It should be understood that the apparatus 100 depicted in FIG. 1A may include additional components and that some of the components described herein may be removed and/or modified without departing from a scope of the apparatus 100 disclosed herein.

The apparatus 100 may include a printhead 102 (which is also recited herein as a delivery device or a fluid delivery device) that is to deliver a printing liquid 104 onto a media (not shown) from firing chambers 106 through a plurality of bores 108 (which are also recited herein as channels) arranged along a surface 110 of the printhead 102. The surface 110 of the printhead 102 may be part of a bore plate 112 on the printhead 102. The firing chambers 106 may include firing devices (shown as element 114 in FIGS. 2A-2C) such as thermal inkjet resistors, piezoelectric actuators, or the like. For instance, the firing devices may be activated or actuated to cause droplets of the printing liquid 104 to be expelled through the bores 108 and onto media. The media may be paper, build material particles, or any suitable material upon which the printing liquid 104 may be delivered. The printing liquid 104 may be an ink, a dye, a fusing agent, a detailing agent, or the like. By way of particular example, the printing liquid 104 is an agent that is to one of enhance melting of build material particles (e.g., fusing agent) and limit melting of build material particles (e.g., detailing agent) in the fabrication of 3D objects from the build material particles.

The bores 108 may be arranged along a surface 110 of the printhead 102 that faces the media upon which the printing liquid 104 is delivered. Additionally, the bores 108 may be arranged in parallel rows that extend into the illustration shown in FIG. 1A. By way of example, a large number of firing chambers 106 and bores 108 may be arranged along parallel rows, for instance, numbering in the tens to the thousands such that the printing liquid 104 may be delivered onto relatively large swaths of media, e.g., about 6 to about 30 inches across.

The apparatus 100 may also include a cleaning system 120 that is to apply a pressurized cleaning fluid 122 onto the surface 110 of the printhead 102 on which the bores 108 are arranged. Particularly, the cleaning system 120 may apply the pressurized cleaning fluid 122 onto the surface 110 while preventing application of the pressurized cleaning fluid 122 into the firing chambers 106 through the bores 108. That is, for instance, the cleaning system 120 may apply the pressurized cleaning fluid 122 onto the surface 110 without directing the pressurized cleaning fluid 122 into the bores 108. Generally speaking, the cleaning fluid 122 may be water, solvent, or other suitable fluid for cleaning the surface 110 of the printhead 102 without, for instance, damaging or degrading the bore plate 112. In addition, or in other examples, the cleaning fluid 122 may include a substance that may provide a benefit to the bore plate 112, e.g., the cleaning fluid 112 may replace a substance that may have be provided on the bore plate 112 and may have been removed during use.

The cleaning system 120 (which is also recited herein as a delivery device cleaning apparatus) may include a plurality of nozzles 124 through which the pressurized cleaning fluid 122 may be applied to the surface 110 of the printhead 102 or equivalently, the surface 110 of the bore plate 112. As shown, the pressurized cleaning fluid 112 may be supplied to the nozzles 124 through a conduit 126. That is, the pressurized cleaning fluid 122 may be supplied into the conduit 126 from a pressurizing device (shown in FIGS. 2A-2C) as denoted by the arrow 128 and may be expelled or sprayed through the nozzles 124. The pressurized cleaning fluid 122 may be sprayed from the nozzles 124 as aerosol sprays, nanosprays, ultrasonic sprays, etc. The pressurizing device may include a compressor, a heater, a pump, or other mechanism for pressurizing the cleaning fluid 122 and delivering the pressurized cleaning fluid to the nozzles 124 to be sprayed onto the surface 110.

According to examples, the nozzles 124 may be positioned such that the pressurized cleaning fluid 122 is applied onto the surface 110 while preventing application of the pressurized cleaning fluid into the firing chambers 106 through the bores 108. As shown in FIG. 1A, the nozzles 124 may be positioned with respect to the printhead 102 to direct the pressurized cleaning fluid 122 onto areas of the surface 110 at which the bores 108 are not positioned. This is further shown in FIG. 1B, which depicts simplified diagrams 150 of an example arrangement of nozzles 124 of the cleaning system 120 and an example arrangement of the bores 108 arranged along the surface 110 of the printhead 102. In other words, FIG. 1B depicts a top view of the nozzles 124 and a bottom view of the surface 110 of the printhead 102 being supplied with the pressurized cleaning fluid as shown in FIG. 1A.

Figure 1B:
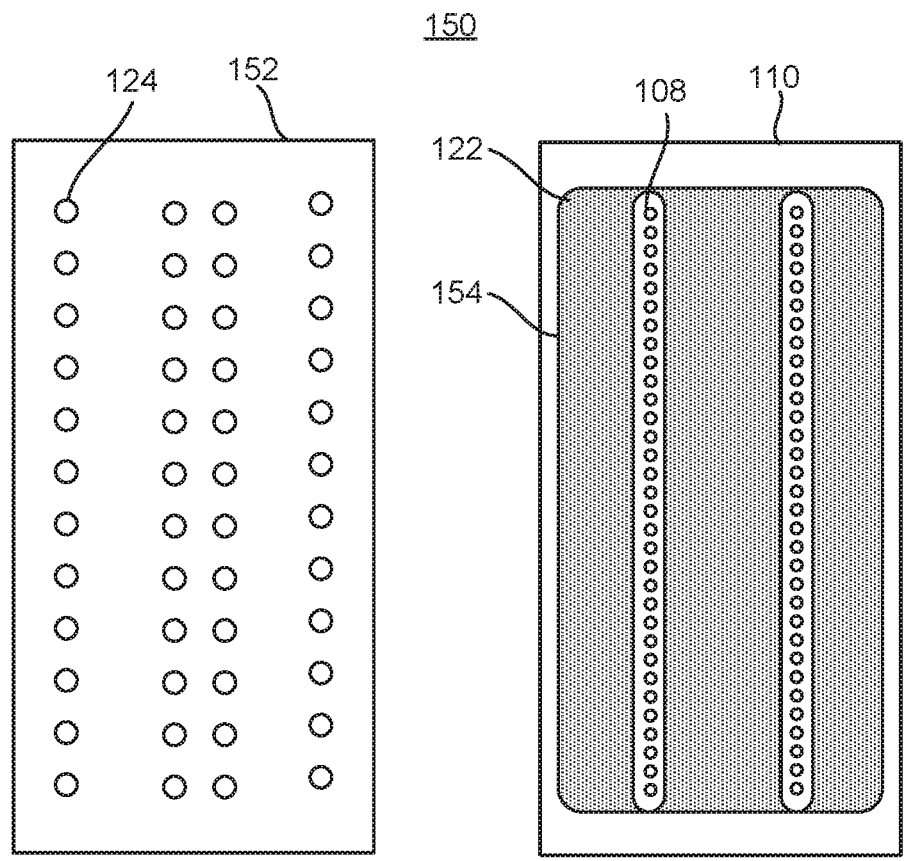
FIG. 1B shows simplified diagrams of an example arrangement of nozzles of the cleaning system and an example arrangement of bores arranged along the surface of the printhead depicted in FIG. 1A.

As shown in FIG. 1B, the bores 124 may be positioned on a substrate 152 that may house the conduits 126 that are in fluid communication with a pressurizing device and may maintain the nozzles 124 in a predetermined arrangement. Particularly, for instance, the nozzles 124 may be arranged to substantially surround the bores 108 such that the nozzles 124 deliver pressurized cleaning fluid 122 onto areas of the surface 110 as identified by the shaded region 154. That is, the nozzles 124 may be arranged to deliver the pressurized cleaning fluid 122 onto the surface 110 without delivering the pressurized cleaning fluid 122 into the bores 108.

Figure 2A:
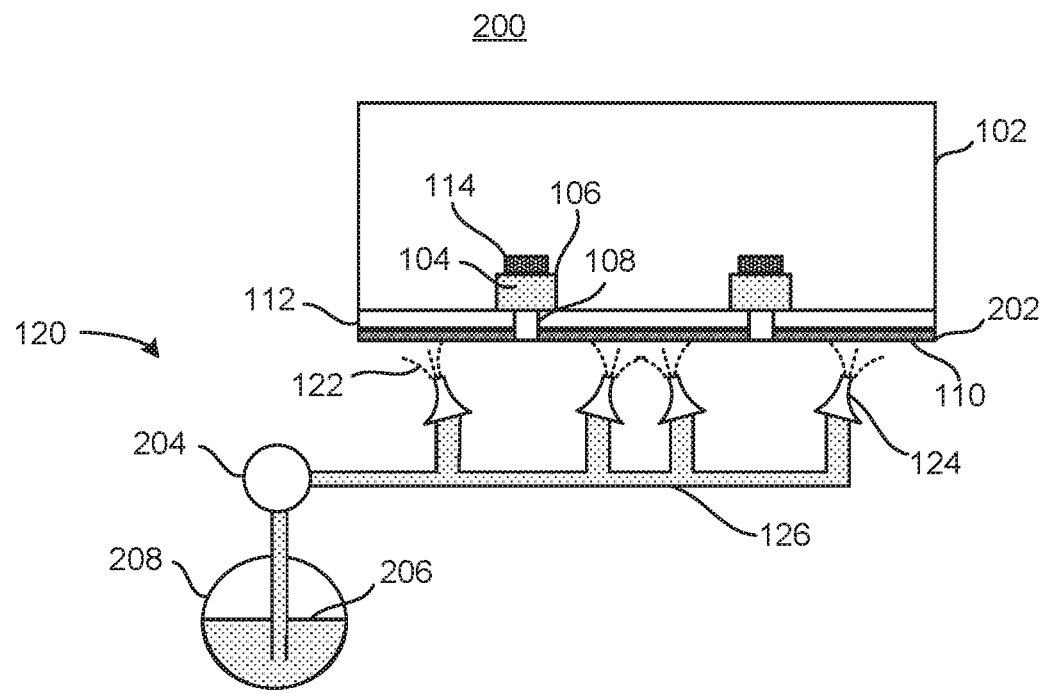
FIGS. 2A-2C, respectively, depict simplified block diagrams of other example apparatuses that may include components of a cleaning system.
Figure 2B:
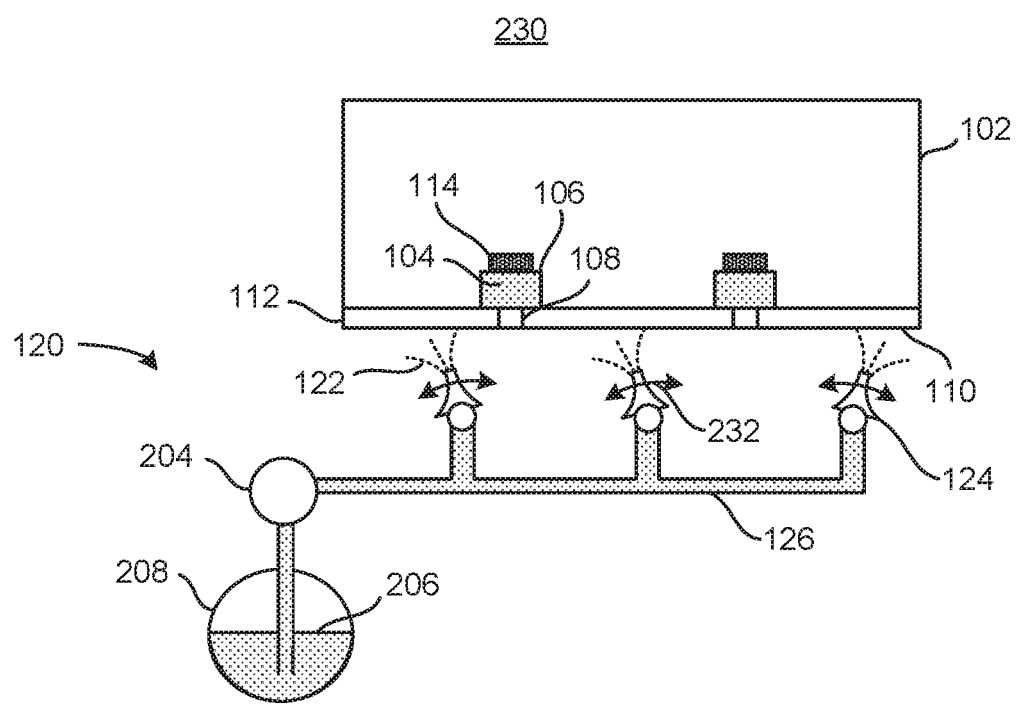
Figure 2C:
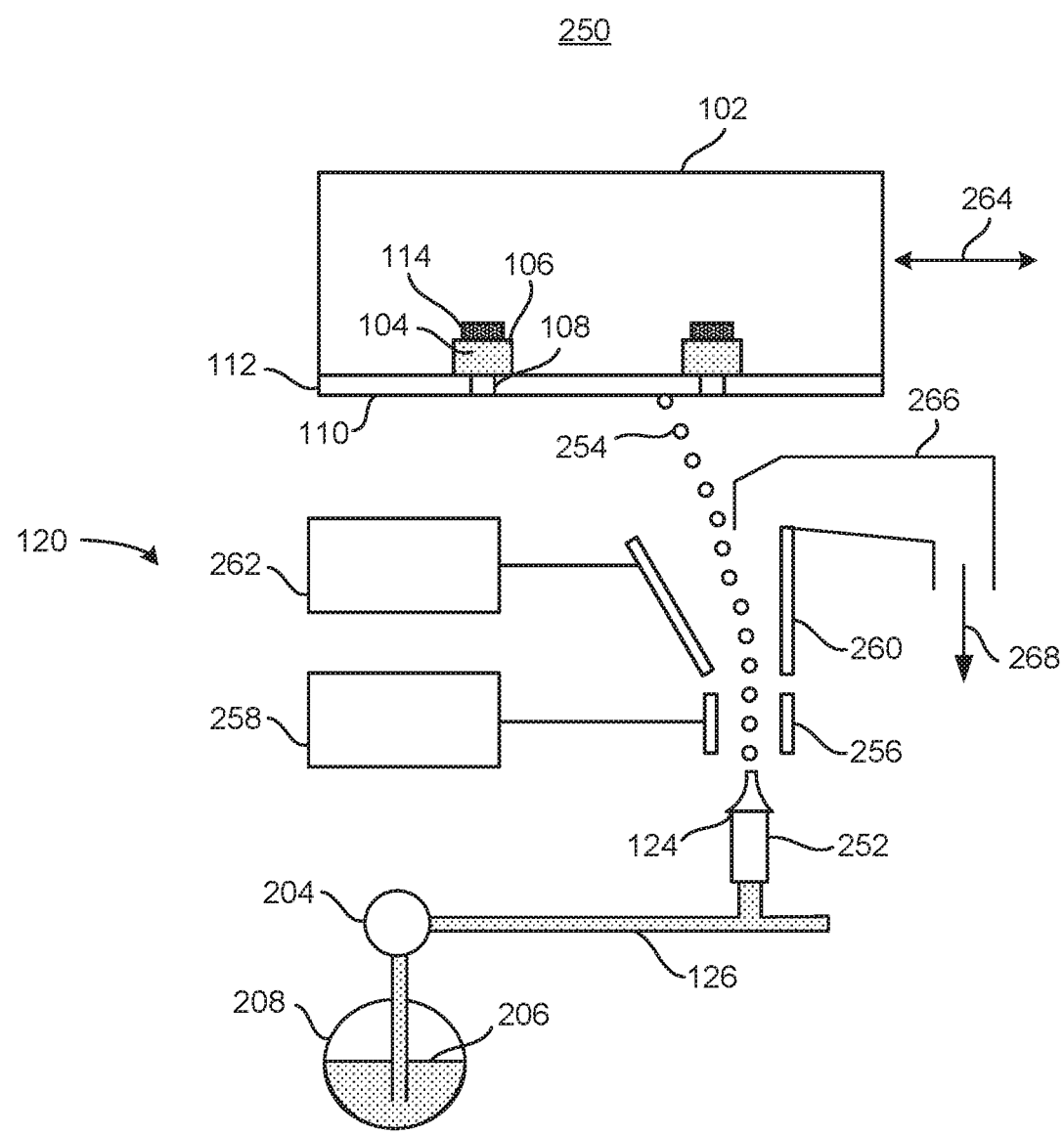

Turning now to FIGS. 2A-2C, there are respectively shown simplified block diagrams of other example apparatuses 200, 230, 250 that may include components of a cleaning system. It should be understood that the apparatuses 200, 230, 250 respectively depicted in FIGS. 2A-2C may include additional components and that some of the components described herein may be removed and/or modified without departing from scopes of the apparatuses 200, 230, 250 disclosed herein.

The apparatuses 200, 230, 250 depicted in FIGS. 2A-2C may include many of the same elements as those discussed above with respect to FIGS. 1A and 1B and thus, the common elements are not described again in detail with respect to FIGS. 2A-2C. Instead, it should be understood that the descriptions of the common elements provided above with respect to FIGS. 1A and 1B are intended to also describe those elements with respect to FIGS. 2A-2C.

With reference first to FIG. 2A, the printhead 102 in the apparatus 200 may include a stick resistant material 202 applied to a bottom surface of the bore plate 112. Generally speaking, the stick resistant material 202 may be any suitable material that reduces or prevents sticking of particles and/or enhances removal of particles that may have become stuck to the material 202. By way of example, the stick resistant material 202 may be polytetrafluoroethylene (PTFE) and may be applied as a layer to the bottom surface of the bore pate 112 through any suitable deposition process. In addition, the stick resistant material 202 may be applied such that the bores 108 remain uncovered as shown in FIG. 2A. As such, the nozzles 124 of the cleaning system 120 may apply pressurized cleaning fluid to exposed surfaces of the layer of stick resistant material 202. It should be understood that the stick resistant material 202 may be applied to the printheads 102 in any of the example apparatuses 100, 200, 230, 250 disclosed herein.

As also shown in FIG. 2A, the nozzles 124 may be positioned at angles that are not perpendicular to the plane at which the bore plate 112 extends. That is, for instance, the nozzles 124 may be angled to direct the pressurized cleaning fluid in directions away from respective sets of the bores 108. For instance, the nozzles 124 may be angled such that they face directions away from their nearest bores 108 as shown in FIG. 2A.

The cleaning system 120 may also include a pressurizing device 204 that is to feed the pressurized cleaning fluid 122 to the nozzles 124 through the conduits 126. The pressurizing device 204 may be a compressor, a heater, a pump, or other mechanism for pressurizing a cleaning fluid 206, which may be contained in a reservoir 208 that the pressurizing device 204 may access. The reservoir 208 may be refilled as necessary from a cleaning fluid source (not shown) and/or from recycling of the cleaning fluid 122 used to clean the surface 110 of the printhead 102.

With reference now to FIG. 2B, the cleaning system 120 of the apparatus 230 is depicted as including all of the same elements as the cleaning system 120 of the apparatus 200. However, in contrast to the cleaning system 120 in the apparatus 200, the nozzles 124 in the cleaning system 120 of the apparatus 230 may be movable. That is, for instance, the nozzles 124 may be pivotable as indicated by the arrows 232 such that the nozzles 124 may direct pressurized cleaning fluid 122 to different sections of the surface 110 outside of the bores 108. Additionally, the nozzles 124 may be pivoted to vary the angles at which the pressurized cleaning fluid 122 is applied to the surface 110. For instance, the nozzles 124 may be pivoted to angles that may force particles on the surface 110 away from the bores 108.

The nozzles 124 may be rotated through any suitable pivoting mechanism while enabling fluid communication with the conduits 126. In addition, the pivoting mechanism may include actuators that a controller (not shown) may control. By way of example, the controller may control the pressurizing device and the pivoting mechanisms to apply the pressurized cleaning fluid 122 onto different sections of the surface 110 according to a preset routine that is to clean the surface 110 without applying the pressurized cleaning fluid 122 into the bores 108.

Turning now to FIG. 2C, the cleaning system 120 of the apparatus 250 is depicted as including all of the same elements as the cleaning system 120 of the apparatus 200. However, the cleaning system 120 in the apparatus 250 may have additional components as compared with the cleaning system 120 in the apparatus 200. Generally speaking, the cleaning system 120 in the apparatus 250 may include components to continuously supply pressurized cleaning fluid 122 through the nozzle 124. As shown, the cleaning system 120 may include a drop generator 252 that may generate and expel droplets 254 of the pressurized cleaning fluid 122. That is, the drop generator 252 may force droplets 254 of the cleaning fluid 122 to be generated and expelled with sufficient force to enable the droplets 254 to contact the surface 110. While the droplets 254 are in flight, the trajectories of the droplets 254 may be controlled to thus control the locations on the surface at which the droplets 254 make contact.

Particularly, the cleaning system 120 may include a charge electrode 256 that is to receive an electrical charge from a power source 258. The cleaning system 120 may also include a deflector plate 260 that may be controlled by and may receive power from a controller 262. As the droplets 254 are expelled through the nozzle 124, the droplets 254 pass through the charge electrode 256, and the droplets 254 may receive an electrical charge from the electrical field generated by the charge electrode 256. In addition, when activated, the deflector plate 260 may generate an electrostatic charge that may apply a force on the charged droplets 254 to alter the trajectories of the charged droplets 254 during flight. That is, the controller 262 may vary the voltage applied to the deflector plate 260 to vary the electrostatic charge generated and controllably vary the trajectories of the droplets 254 such that the droplets 254 land on intended locations of the surface 110.

In this regard, the controller 262 may control the amount of deflection applied onto the charged droplets 254 to control application of the cleaning fluid droplets 254 onto the surface 110. Particularly, for instance, the controller 262 may control the deflector plate 260 to apply the cleaning fluid droplets 254 onto the surface while preventing application of the cleaning fluid droplets 254 into the firing chambers 106 through the bores 108. The locations on the surface 110 at which the droplets 254 are applied may further be controlled through movement of the printhead 102 and/or the cleaning system 120 with respect to each other as indicated by the arrow 264.

According to examples, the droplet generator 252 may generate and fire the droplets 254 in a continuous manner. That is, for instance, the droplet generator 252 may continue to generate and fire the droplets 254 even though the droplets 254 may not be able to reach the intended locations on the surface 110. In these examples, and as shown in FIG. 2C, the cleaning system 120 may also include a gutter 266 to which excess, e.g., droplets 254 that are not intended to be directed to the surface 110, may be directed. For instance, the droplets 254 may be directed to the gutter 266 when an electrostatic force is not applied onto the droplets 254 by the deflector plate 260. The droplets 254 collected by the gutter 266 may be discarded or returned to the reservoir 208 for reuse as indicated by the arrow 268.

Although not shown in FIGS. 2A-2C, the apparatuses 200, 230, 250 may also include a cleaning fluid recovery system (not shown) that may collect used cleaning fluid and may discard the used cleaning fluid. The cleaning fluid recovery system may additionally or in other examples collect the used cleaning fluid, filter particles from the collected cleaning fluid, and may reintroduce the filtered cleaning fluid for reuse in cleaning the surfaces 110 of a printhead 102. In addition or in other examples, the apparatuses 200, 230, 250 may include a wiping mechanism (not shown) that may be implemented to wipe the cleaning fluid as well as debris from the surface 110.

Figure 3:
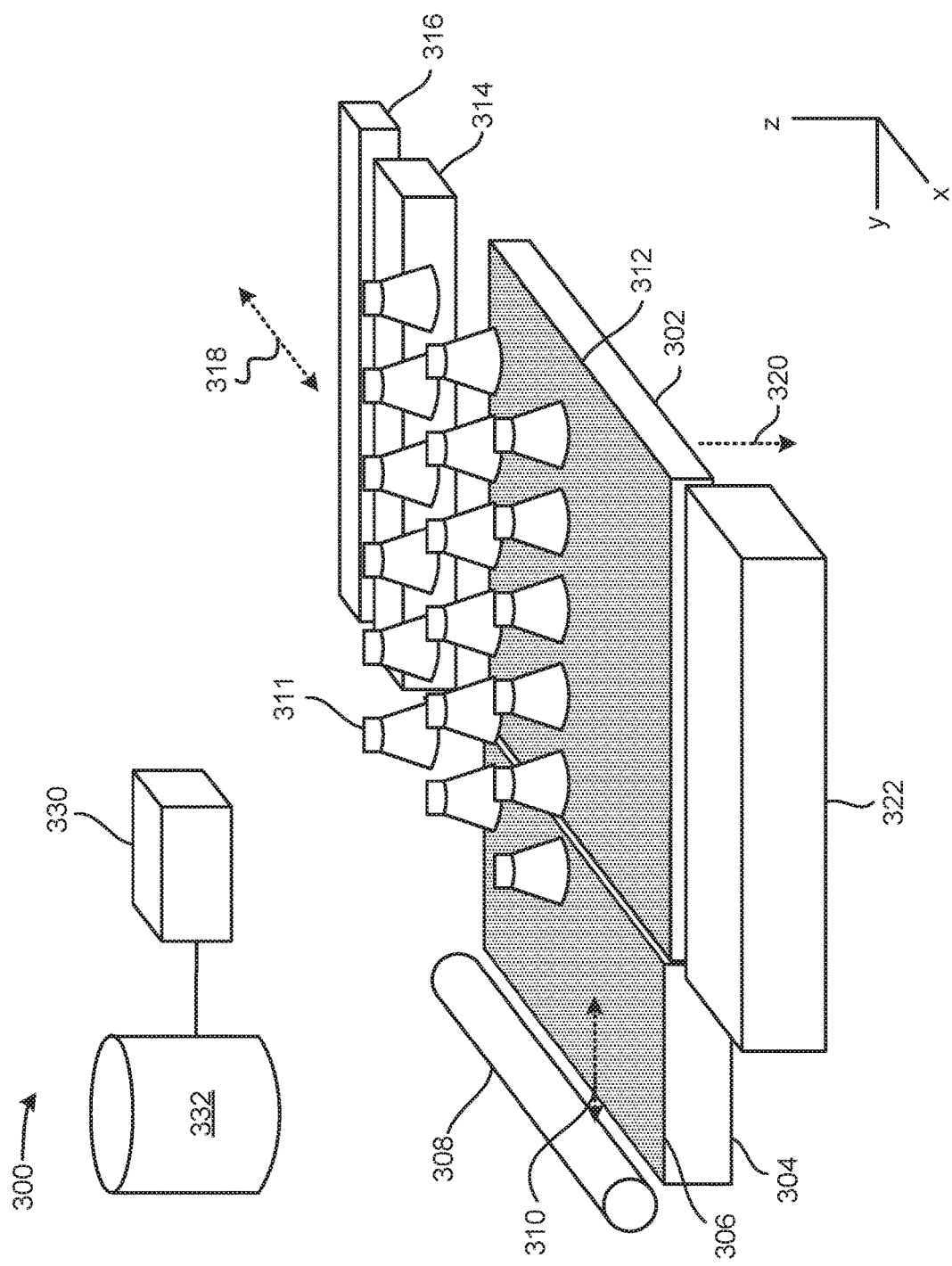
FIG. 3 shows a simplified block diagram of an example three-dimensional (3D) printer that may include a fluid delivery device and a fluid delivery device cleaning system.

With reference now to FIG. 3, there is shown a simplified block diagram of an example three-dimensional (3D) printer 300 that may include a fluid delivery device and a fluid delivery device cleaning system. It should be understood that the 3D printer 300 depicted in FIG. 3 may include additional components and that some of the components described herein may be removed and/or modified without departing from a scope of the 3D printer 300 disclosed herein.

The 3D printer 300 may include a build area platform 302, a build material supply 304 containing build material particles 306, and a recoater 308. The build material supply 304 may be a container or surface that is to position build material particles 306 between the recoater 308 and the build area platform 302. Generally speaking, 3D objects or parts are to be generated from the build material particles 306 and the build material particles 306 may be formed of any suitable material including, but not limited to, polymers, metals, and ceramics. In addition, the build materials 106 may be in the form of a powder.

The recoater 308 may move in a direction as denoted by the arrow 310, e.g., along the y-axis, over the build material supply 304 and across the build area platform 302 to spread a layer 312 of the build material particles 306 over a surface of the build area platform 302. The recoater 108 may also be returned to a position adjacent the build material supply 304 following the spreading of the build material particles 106. The recoater 108 may be a doctor blade, roller, a counter rotating roller or any other device suitable for spreading the build materials 106 over the build area platform 302. The 3D printer 300 may also include a plurality of warming devices 311 arranged in an array above the build area platform 302. In addition, or in other examples, the print bed 302 may be heated to apply heat onto spread layers of the build material particles 306.

The 3D printer 300 may further include a fluid delivery device 314 and a radiation generator 316, which may both be scanned across the build area platform 302 in both of the directions indicated by the arrow 318, e.g., along the x-axis. The delivery device 314 may be, for instance, a thermal inkjet printhead, a piezoelectric printhead, or the like, and may extend a width of the build area platform 302. The fluid delivery device 314 may be equivalent to the printheads 102 discussed above. In other examples in which the fluid delivery device 314 does not extend the width of the build area platform 302, the fluid delivery device 314 may also be scanned along the y-axis to thus enable the fluid delivery device 314 to be positioned over a majority of the area above the build area platform 302. The fluid delivery device 314 may be attached to a moving XY stage or a translational carriage (neither of which is shown) that is to move the delivery device 314 adjacent to the build area platform 302 in order to deposit respective liquids in predetermined areas of a layer of the build material particles 306.

The fluid delivery device 314 may include a plurality of bores 108 (FIGS. 2A-2C) arranged on a surface 110 of the fluid delivery device 314 through which printing liquid may be ejected onto the build material particles 306 in the build material layer 312. According to some examples, the printing liquid may be a fusing agent and/or a detailing agent. A fusing agent may be a liquid that is to absorb fusing radiation (e.g., in the form of light and/or heat) to cause the build material particles 306 upon which the fusing agent has been deposited to fuse together when the fusing radiation is applied. A detailing agent may be a liquid that may absorb significantly less of the fusing radiation as compared with the fusing agent. In one example, the detailing agent may prevent or significantly reduce the fusing together of the build material particles 306 upon which the detailing agent has been deposited. In other examples, the detailing agent may be implemented to provide coloring to exterior portions of the build material particles 306 that have been fused together.

Following deposition of the printing liquid onto selected areas of the layer 312 of the build material particles 306, the radiation generator 316 may be implemented to apply fusing radiation onto the build material particles 306 in the layer 312. Particularly, for instance, the radiation generator 316 may be activated and moved across the layer 312, for instance, along the directions indicated by the arrow 318, to apply fusing radiation in the form of light and/or heat onto the build material particles 306. Examples of the radiation generator 318 may include a UV, IR or near-IR curing lamp, an IR or near-IR light emitting diode (LED), a halogen lamp emitting in the visible and near-IR range, or a laser with desirable electromagnetic wavelengths. According to an example, the fluid delivery device 314 and the fusing radiation generator 316 may be supported on a carriage (not shown) that may be scanned over the build area platform 302 in the directions denoted by the arrow 318.

Following application of the radiation to fuse selected sections of the build material particles 306 together, the build area platform 302 may be lowered as denoted by the arrow 320, e.g., along the z-axis. In addition, the recoater 308 may be moved across the build area platform 302 to form a new layer 312 of build material particles 306 on top of the previously formed layer. Moreover, the fluid delivery device 314 may deposit printing liquid onto selected locations of the new layer 312. The above-described process may be repeated until a predetermined number of layers have been formed to fabricate a green body of a desired 3D part.

During the process discussed above, some of the build material particles 306 may become attached to a surface 110 of the fluid delivery device 314 on which the bores 108 are arranged. This may occur because the build material particles 306 may have small particle sizes, e.g., between about 20 microns to about 80 microns, and may thus be disturbed and may become airborne relatively easily. For instance, some of the build material particles 306 may splash toward the surface 110 during application of the printing liquid through the bores 108. According to examples, the 3D printer 300 may include a cleaning system 322 to clean the surface 110 of the fluid delivery device 314. The cleaning system 322 may be similar to any of the cleaning systems 120 discussed above with respect to FIGS. 1A-20. In addition, the cleaning system 322 may be part of service station of the 3D printer 300.

According to examples, the fluid delivery device 314 (printhead 102) may be moved between a printing position and a cleaning position. In the printing position, the fluid delivery device 314 may move over the print bed 302 to apply printing liquid onto the build material particles 306 in a layer 312. In the cleaning position, the fluid delivery device 314 may move over the cleaning system 322 such that pressurized cleaning fluid 122 may be applied to the surface 110 of the fluid delivery device 314. Additionally, while in the cleaning position, additional service station operations may be performed on the fluid delivery device 314, such as, wiping, capping, testing, etc.

As further shown in FIG. 3, the 3D printer 300 may include a controller 330 that may control operations of the build area platform 302, the build material supply 304, the recoater 308, the warming devices 311, the fluid delivery device 314, the radiation generators 316, and the cleaning system 322. Particularly, for instance, the controller 330 may control actuators (not shown) to control various operations of the 3D printer 300 components. The controller 330 may be a computing device, a semiconductor-based microprocessor, a central processing unit (CPU), an application specific integrated circuit (ASIC), a graphics processing unit (GPU), a field programmable gate array (FPGA), and/or other hardware device. Although not shown, the controller 330 may be connected to the 3D printer 300 components via communication lines.

The controller 330 may be in communication with a data store 332. The data store 332 may include data pertaining to a 3D part to be printed by the 3D printer 300. For instance, the data may include the locations in each build material layer 312 that the fluid delivery device 314 is to deposit printing liquid to form the green body of the 3D part. In one example, the controller 330 may use the data to control the locations on each of the build material layers 312 that the fluid delivery device 314 deposits the printing liquid.

Additionally, the controller 330 may control when the fluid delivery device 314 is moved to the cleaning position over the cleaning system 322. For instance, the controller 330 may determine when a certain amount of time has expired, when the fluid delivery device 314 has deposited a certain amount of printing liquid, when a user has instructed the controller 330 to perform a cleaning operation, or the like. In response to the determination, the controller 330 may control an actuator of the fluid delivery device 314 or an actuator of a carriage on which the delivery device 314 is supported to move the fluid delivery device 314 to a position to be cleaned by the cleaning system 322.

Figure 4:
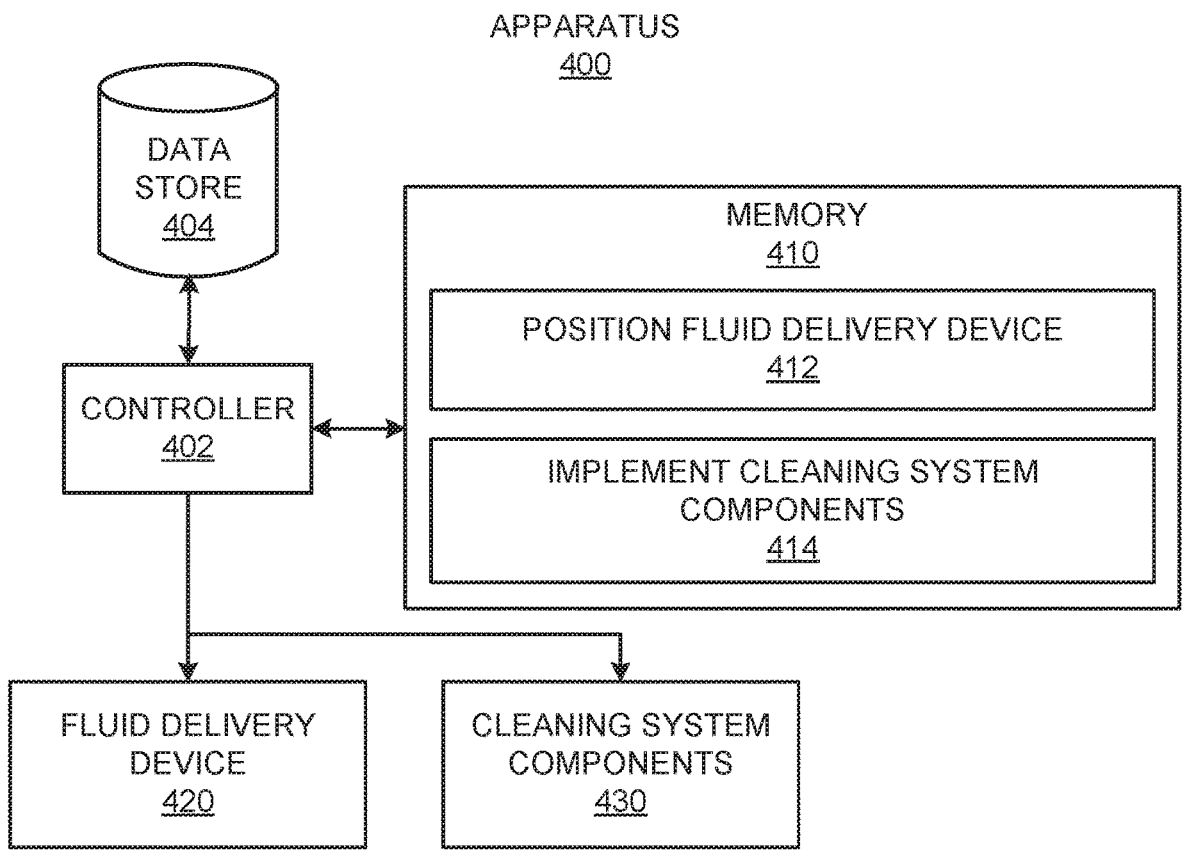
FIG. 4 depicts a simplified block diagram of another example apparatus that may be implemented to clean a surface of a fluid delivery device.

Turning now to FIG. 4, there is shown a simplified block diagram of another example apparatus 400 that may be implemented to clean a surface 110 of a fluid delivery device. It should be understood that the apparatus 400 depicted in FIG. 4 may include additional components and that some of the components described herein may be removed and/or modified without departing from a scope of the apparatus 400 disclosed herein.

The apparatus 400 may include a controller 402 that may control operations of the apparatus 400 and a data store 404 that may store data that is accessible by the controller 402. The controller 402 may be a semiconductor-based microprocessor, a central processing unit (CPU), an application specific integrated circuit (ASIC), a field-programmable gate array (FPGA), a graphics processing unit (GPU), and/or other hardware device. The apparatus 400 may also include a memory 410 that may have stored thereon machine readable instructions 412-414 (which may also be termed computer readable instructions) that the controller 402 may execute. The memory 410 may be an electronic, magnetic, optical, or other physical storage device that contains or stores executable instructions. The memory 410 may be, for example, Random Access Memory (RAM), an Electrically Erasable Programmable Read-Only Memory (EEPROM), a storage device, an optical disc, and the like. The memory 410, which may also be referred to as a computer readable storage medium, may be a non-transitory machine-readable storage medium, where the term "non-transitory" does not encompass transitory propagating signals.

The apparatus 400 may be a computing device such as a personal computer, a laptop computer, a smartphone, a server computer, a tablet computer, or the like. In other examples, the apparatus 400 may be or form part of a 3D printer. The controller 402 may communicate instructions to a fluid delivery device 420 and cleaning system components 430 over a network, through a wired connection, a bus, or the like.

With reference to FIGS. 1A, 3, and 4, the controller 402 may fetch, decode, and execute the instructions 412 to position the fluid delivery device 420 (printhead 102) over a cleaning system 120, 322. That is, the controller 402 may execute the instructions 412 to cause the fluid delivery device 420 to be moved to a cleaning position over the cleaning system 322. As discussed above, the fluid delivery device 420 may have firing chambers 106 and a plurality of channels 108 provided along a plate 112 through which printing liquid is to be expelled from the firing chamber's 106.

The controller 402 may also fetch, decode, and execute the instructions 414 to control the cleaning system components 430 to apply pressurized cleaning fluid 122 to the plate 112 (e.g., surface 110) while avoiding application of the pressurized cleaning fluid into the firing chambers 106 through the plurality of channels 108. The cleaning system components 430 may include a pressurizing device 204 and/or the nozzles 124. For instance, the controller 402 may control the pressurizing device 204 to vary the amount of pressure applied to cleaning fluid contained in the conduits 126 to vary the timing/volume of pressurized cleaning fluid 122 sprayed onto the plate 112. In addition or as another example, the controller 402 may control the nozzles 124 either individually or collectively to vary the sizes of the openings in the nozzles 124 and thus vary the timing/volume of pressurized cleaning fluid 122 sprayed onto the plate 112. Moreover, the controller 402 may control other aspects of the pressurized cleaning fluid 122 delivery as discussed above with respect to FIGS. 2A-2C.

Figure 5:
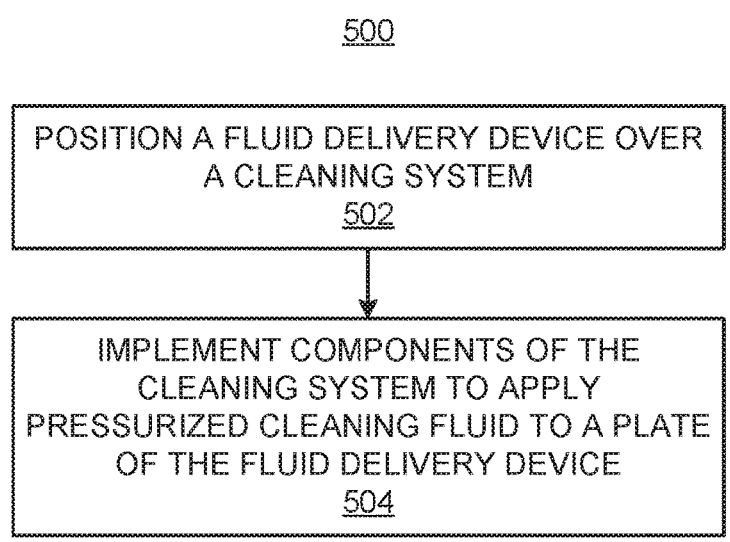
FIG. 5 depicts a flow diagram of an example method for cleaning the surface of a fluid delivery device.

Various manners in which the apparatus 400 may be implemented are discussed in greater detail with respect to the method 500 depicted in FIG. 5. Particularly, FIG. 5 depicts a flow diagram of an example method 500 for cleaning a surface 110 of a fluid delivery device 102, 314. It should be understood that the method 500 depicted in FIG. 4 may include additional operations and that some of the operations described therein may be removed and/or modified without departing from the scope of the method 500. The description of the method 500 is made with reference to the features depicted in FIGS. 1A-4 for purposes of illustration. Generally speaking, the controller 402 of the apparatus 400 may implement or execute some or all of the instructions 412-414 stored on the memory 410 to perform the method 500. However, it is contemplated that other computing devices may implement or perform the operations described with respect to the method 500.

At block 502, a fluid delivery device 314 (e.g., a printhead 102) may be positioned over a cleaning system 120, 322. The cleaning system 120, 322 may include components that are to apply a pressurized cleaning fluid onto the fluid delivery device 102, 314. In addition, the fluid delivery device 314 may have firing chambers 106 and a plurality of channels 108, in which the channels 108 may be provided along a plate 122 through which printing liquid is to be expelled from the firing chambers 106.

At block 504, the components of the cleaning system 120, 322 may be implemented to apply pressurized cleaning fluid 122 to the plate 112 (e.g., surface 110) while avoiding application of the pressurized cleaning fluid 122 into the firing chambers 106 through the plurality of channels 108. The components of the cleaning system 120, 322 may be implemented in any of the manners described above with respect to FIGS. 1A-4 to apply the pressurized cleaning fluid while avoiding application of the pressurized cleaning fluid 122 into the firing chambers 106.

According to examples, additional cleaning operations may be performed on the fluid delivery device 102, 314. For instance, the cleaning system 120, 322 may include a wiping mechanism that will be implemented to wipe the surface 110 to remove the cleaning fluid and debris from the surface 110. In addition or in other examples, the cleaning system 120, 322 may include a shaking mechanism that may shake the print head 102, 314 prior to application of the cleaning fluid 122. As other examples, the cleaning system 120, 322 may include an ultrasound mechanism that may apply ultrasound onto the printhead. In these examples, loose debris may be removed from the surface 110 prior to application of the cleaning fluid 122, which may reduce the chances of debris being delivered into the firing chambers 106 through the bores 108.

Some or all of the operations set forth in the method 500 may be contained as utilities, programs, or subprograms, in any desired computer accessible medium. In addition, the method 500 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
    a printhead to deliver a printing liquid from firing chambers through a plurality of bores arranged along a surface of the printhead; and
    a cleaning system including a plurality of nozzles and a pressuring device to pressurize a cleaning fluid to be sprayed out of the plurality of nozzles to clean the surface of the printhead,
    wherein the plurality of nozzles are aligned with sections of the surface of the printhead outside of the plurality of bores of the printhead when the printhead is positioned in a cleaning position with respect to the cleaning system to cause the pressurized cleaning fluid to be applied onto the surface of the printhead while preventing the pressurized cleaning fluid from entering into the plurality of bores of the printhead,
    wherein the cleaning system further includes:

a drop generator to generate droplets of the pressurized cleaning fluid and fire the droplets toward the printhead;

a charge electrode to apply a charge to the droplets;

a deflection plate to apply a voltage onto the charged droplets while the charged droplets are in flight toward the printhead; and a controller of the deflection plate to adjust the voltage applied by the deflection plate to vary trajectories of the charged droplets to direct the charged droplets away from the plurality of bores of the printhead.

2. The apparatus according to claim 1, wherein the printhead is movable between a printing position and the cleaning position, wherein in the printing position, the printhead delivers the printing liquid and in the cleaning position, the cleaning system applies the pressurized cleaning fluid to the printhead.

3. The apparatus according to claim 1, wherein the cleaning system further includes a pivoting mechanism to control a movement of the plurality of nozzles.

4. The apparatus according to claim 1, wherein the printing liquid is a fusing agent to be applied onto build material particles and wherein the cleaning system is to apply the pressurized cleaning fluid to remove build material particles from the surface of the printhead.

5. The apparatus according to claim 4, wherein the surface of the printhead is coated with a stick resistant material to reduce sticking of the build material particles from the surface of the printhead.

6. An apparatus comprising:
a printhead to deliver a printing liquid from firing chambers through a plurality of bores arranged along a surface of the printhead; and
a cleaning system comprising:
a plurality of pivotable nozzles,
a pressuring device to pressurize a cleaning fluid to be sprayed out of the plurality of pivotable nozzles when the printhead is in a cleaning position,
a drop generator to generate droplets of the pressurized cleaning fluid and fire the droplets toward the printhead,
a charge electrode to apply a charge to the droplets,
a deflection plate to apply a voltage onto the charged droplets while the charged droplets are in flight toward the printhead, and
a controller of the deflection plate to adjust the voltage applied by the deflection plate to vary trajectories of the charged droplets to direct the charged droplets away from the plurality of bores of the printhead and prevent the pressurized cleaning fluid from entering into the plurality of bores of the printhead.

7. The apparatus of claim 6, wherein the printhead is movable between a printing position and the cleaning position, wherein in the printing position, the printhead delivers the printing liquid.

8. The apparatus of claim 6, wherein the printing liquid is a fusing agent to be applied onto build material particles and wherein the cleaning system is to apply the pressurized cleaning fluid to remove build material particles from the surface of the printhead.

9. The apparatus according to claim 8, wherein the surface of the printhead is coated with a stick resistant material to reduce sticking of the build material particles on the surface of the printhead.

10. The apparatus of claim 6, wherein the cleaning system further comprises a pivoting mechanism to control a movement of the plurality of pivotable nozzles.

* * * * *